Sept. 30, 1958 SHIN-ICHI TOKUMOTO ET AL 2,854,392
ARC DISCHARGE PRODUCTION OF LOW VALENCY HALIDES OF TITANIUM
Filed Sept. 22, 1955 2 Sheets-Sheet 1
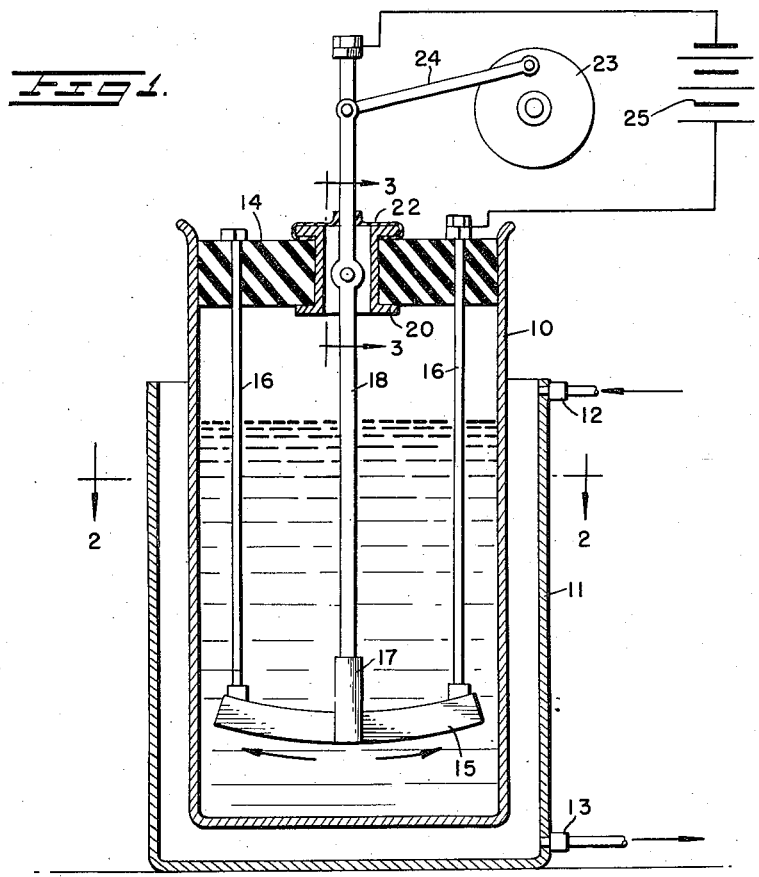
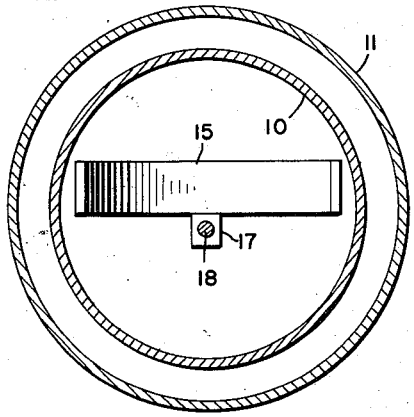
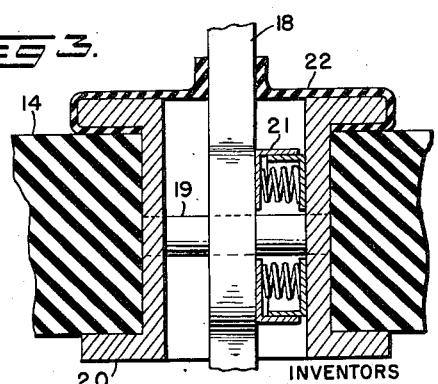
INVENTORS
SHIN-ICHI TOKUMOTO
EIJI TANAKA
RYUZO NISHIYAMA
KIYOSHI MIZUSHIMA
HIROSHI NOZAKI
RYUZABURO TAGUTI
KICHIHEI MATSUI
BY Harold T. Stowell
ATTORNEY

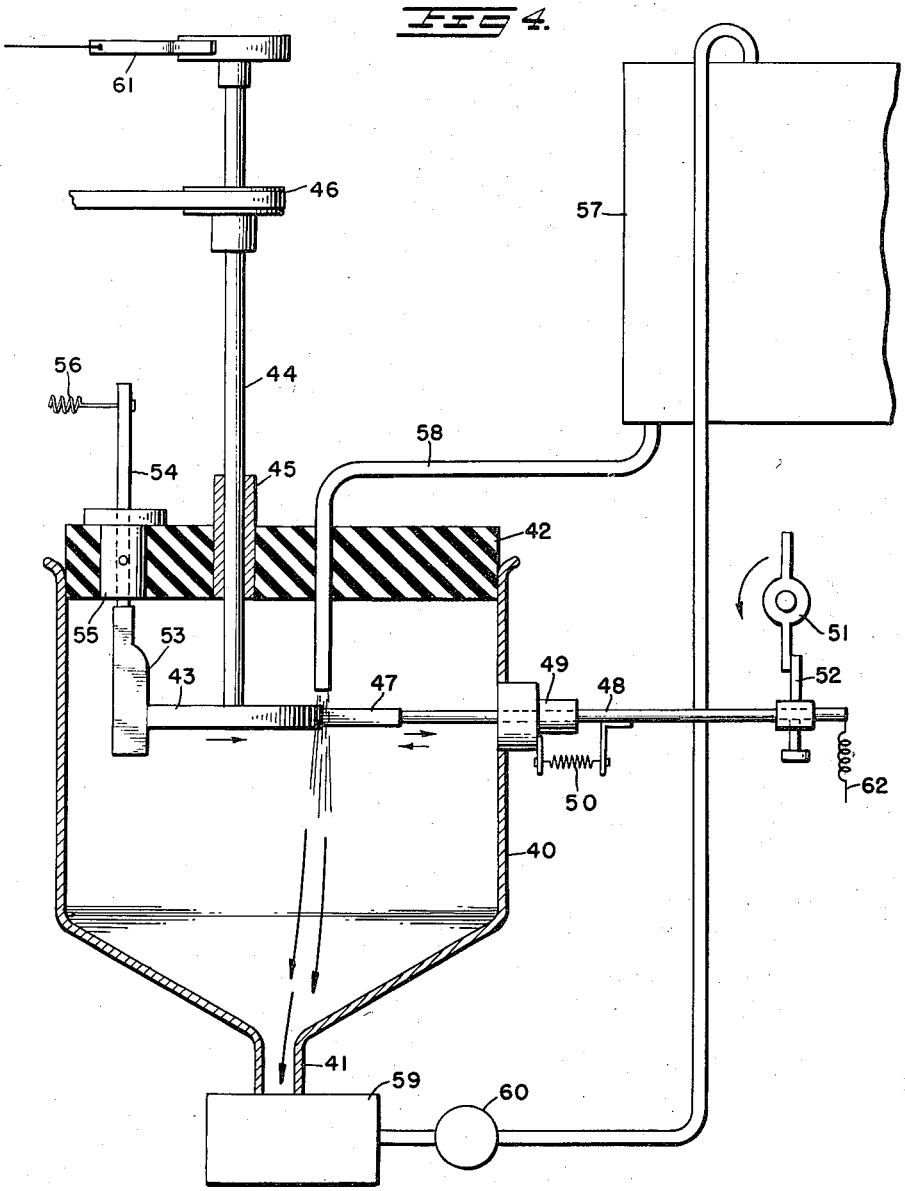

United States Patent Office 2,854,392
Patented Sept. 30, 1958

2,854,392

ARC DISCHARGE PRODUCTION OF LOW VALENCY HALIDES OF TITANIUM

Shin-Ichi Tokumoto, Chiyodaku, Tokyo, Eiji Tanaka, Suzuka, Mie-ken, Ryuzo Nishiyama, Marugame, Kagawa-ken, Kiyoshi Mizushima, Yokkaichi, Mie-ken, Hiroshi Nozaki, Chiba, Chiba-ken, Ryuzaburo Taguti, Bunkyoku, Tokyo, and Kichihei Matsui, Chiba, Chiba-ken, Japan Application September 22, 1955, Serial No. 536,034

17 Claims. (Cl. 204—164)

This invention relates to a method of producing low valency halides of titanium from high valency halides of titanium by causing high valency halides of titanium to react with a substance forming an electrode in a bath in which arc discharge is made to take place. More particularly, this invention relates to a method of producing low valency halides of titanium from high valency halides of titanium wherein arc discharge is caused intermittently in a bath of high valency halides of titanium alone or with the addition of a suitable auxiliary substance thereto or is caused while circulating said bath so as to bring about the same effect as of intermittent arc discharge, and the thermal and electrical action of said arc discharge and the reducing action of the substance forming the electrode are utilized.

For example, $TiCl_3$ and $TiCl_2$ are low valency halides with respect to $TiCl_4$, and $TiCl_2$ is a low valency halide with respect to $TiCl_3$.

Low valency halides of titanium are low in electrical conductivity and can be thermodecomposed. Therefore, as a method of obtaining such wanted products at a favorable efficiency, intermittent arc discharge is caused in a bath or arc discharge is caused while circulating the bath so as to bring about the same effect as of the intermittent arc discharge. First of all, a method wherein arc discharge produced at the time of transition from passage to interruption of electricity by using a low voltage is effectively utilized and wherein the surfaces of the electrodes are made to rub on each other as a means which can smoothly repeat and continue said passage and interruption of electricity as required for the generating of arcs will now be described with reference to examples.

The method of the invention will be particularly described with reference to the accompanying drawings, in which:

Fig. 1 is a diagrammatic view in sectional elevation of apparatus suitable for practising the method of the invention;

Fig. 2 is a horizontal section on line 2—2 of Fig. 1;

Fig. 3 is a fragmentary enlarged section of the pivotal mounting of electrode 17 at 180° to the section of Fig. 1;

Fig. 4 is a diagrammatic view in partial section of a modified form of apparatus suitable for practising the method of the invention.

In Figs. 1-3, 10 is a vessel having a jacket 11 provided with inlet 12 and outlet 13 for a heating medium and a closure 14 of insulating material. A fixed electrode 15 is supported from closure 14 by rods 16 and a movable electrode 17 is supported by rod 18 pivotally mounted on pin 19 in sleeve 20 carried in closure 14. As shown more particularly in Fig. 3, a spring-urged cap 21 bears against rod 18 to maintain electrode 17 in pressed contact with electrode 15 and a flexible sealing member 22 prevents gas and vapor exchange between the interior of vessel 10 and the external atmosphere. Rod 18 is oscillated on pin 19 by eccentric drive 23, 24. Rod 18 and one of rods 16 are connected to a suitable source of direct current 25.

The form of apparatus shown in Fig. 4 comprises a vessel 40 having a bottom outlet 41 and fitted with an insulating closure 42. Rotary electrode 43 is carried by rod 44 which is mounted for rotation in bushing 45 by drive means 46. A reciprocable electrode 47 is carried by rod 48 mounted in bushing 49 in the side of tank 40. Electrode 47 is urged into pressure contact with electrode 43 by spring 50 and is periodically reciprocated out of contact with electrode 43 by rotating cam 51 striking adjustable pin 52 on rod 48. A scraper 53 carried by rod 54 mounted in bushing 55 is urged into contact with the periphery of electrode 43 by spring 56. Electrolyte from storage tank 57 is cascaded over the area of contact between electrodes 43 and 47 through supply line 58. Electrolyte from the bottom of vessel 40 passes into sump 59 wherein the reaction products may be separated and the electrolyte returned to tank 57 by means of pump 60. Opposite poles of a suitable source of direct current are connected to electrode rods 44 and 48 at 61 and 62, respectively.

The case of a chlorine compound of titanium shall be detailed as an example. In reducing $TiCl_4$ to $TiCl_3$, about 500 g. of $TiCl_4$ were put into a tank as shown in Fig. 1 of the drawings 80 millimeters in diameter and were kept at about 60° C. Two electrodes made of titanium metal were immersed opposite each other in the bath. One of the two opposed electrodes was fixed while the other electrode was movable with one surface rubbing a surface of the fixed electrode. The area of the surface of the movable electrode facing the fixed electrode was 10 mm. x 10 mm. The area of the surface of the fixed electrode rubbed by the movable electrode was 10 mm. x 40 mm. The rubbing distance was 30 mm. An alternating current was used as an electric source. 30 volts were impressed between the electrodes. The movable electrode was reciprocated 90 times per minute on the surface of the fixed electrode. When arc discharge was caused with a current of 60 amperes flowing at the time of the complete contact of both electrodes, 80 g. of $TiCl_3$ was obtained after 30 minutes.

In the above case, it will be seen from the operating condition between the two electrodes that the arc discharge surfaces of the electrodes are covered with low valency halides produced by arc discharge caused by the first several operations of the contact and separation of the electrodes. Once the electrode surface is covered with the low valency halide, even when both electrodes are in contact with each other, the metals forming the electrodes will not come into direct contact with each other and, therefore, no current will flow between the electrodes.

In such state, that is, with low valency halides interposed between the electrodes, if the movable electrode is made to rub the fixed electrode surface under a definite pressure, a portion of the film layer consisting of the low valency compounds interposed between the electrodes will be scraped off and such contact between the electrode surfaces as will pass currents will be caused.

However, as the film layer of said low valency halide is in the powdered state, when the layer is scraped off, it will not peel off as a sheet of film. The contact surfaces on both electrodes are not as flat and smooth as mirrors but are irregular. Therefore, a rocking movement will also occur in the direction at right angles with the rubbing direction of the movable electrode. Due to these actions, a current corresponding to the impressed voltage will flow through the contacting parts of the electrodes. As the movable electrode is constantly in reciprocating movement, at the moment electricity is passed, the opposed surfaces passing electricity will be separated and, therefore, the current will be interrupted. A spark caused as a transitionary phenomenon at that time will act effectively. Therefore, if an element of large induction coefficient is connected in the electrical supply circuit, the effect will be larger.

As is clear from the above illustration, when using a low voltage, the spark caused at the time of transition from passage to interruption of electricity is effectively utilized. Therefore, the opposed areas of mutual contact of the electrodes, the contact pressure and the speed of the relative movement of the electrodes are the most important factors in providing optimum conditions. An example to make the optimum value of the used electric current clear is given in the following:

470 g. of $TiCl_4$ were put into a tank 80 mm. in diameter and were kept at about 60° C. Two electrodes of magnesium were immersed opposite each other in the bath. The opposed area was 6 mm. x 8 mm. on the movable electrode surface, and 6 mm. x 38 mm. on the fixed electrode surface. A direct current voltage of 20 to 30 volts was impressed between said electrodes. A variable resistor was inserted in the electric circuit and adjusted so as to pass 12 to 60 amperes when the two electrodes were in complete contact with each other. As in the above case, the movable electrode was reciprocated on the fixed electrode surface at the rate of 600 times per minute, the rubbing distance being 30 mm. Arc discharge was caused between the electrodes with a current of 50 amperes at the time of contact. After two hours, 97 g. of $TiCl_3 + MgCl_2$ were yielded.

In this example, when the rubbing was performed at a current of 12 amperes at the time of complete contact of the electrodes, production of low valency substance was hardly seen. At 20 amperes, a little production was seen. Further, at 30 amperes, continuous production could be seen. When the current at the time of contact was 60 amperes, the arc discharge current became large and the magnesium particles which dispersed in molten form at the time of discharge were now seen to float up in the bath while carrying on the reaction represented by the formula $2TiCl_4 + Mg = 2TiCl_3 + MgCl_2$.

In this example, too, as in the foregoing example, as the arc discharge is continued, low valency substance will be produced at the arc discharge portion of the discharge electrode and will cover said portion until arc discharge can no longer smoothly take place. Therefore, as in the above case, it is necessary to provide the contact part with a rubbing function with suitable friction so that the arc discharge may be continued while the contact surface is being renewed thereby. As mentioned above, if the current density at the arc discharge position is not adequate, for example, if the current density is too low, no effective arc discharge will occur at said position and, if the density is too high, the partial consumption of the electrode will be large, causing irregularities on the electrode and making smooth rubbing difficult, and the electrode will not endure use over a long time.

If arc discharge caused by separating both electrodes when the discharge current is too large, for example, when the electric current at the time of contact of the electrodes in the above example exceeds 60 amperes, the metal forming the electrode will disperse as molten particles in the bath and a part of the particles will be unfavorably mixed into the produced low valency substance as metallic particles unused in the reduction of the high valency halide.

This is due to the metal forming the electrode being heated so high that it will be melted and dispersed. Therefore, this defect can be prevented to some extent by adjusting the time and form of arc discharge by inserting an inductance and a capacitance in the circuit of the discharge current and properly selecting the value of the inductance and the capacitance.

The invention will now be described with reference to the case of a bromide compound of titanium. In reducing $TiBr_4$ to low valency $TiBr_3$, a bath of 720 g. of $TiBr_4$ was kept at 120 to 130° C. Two electrodes made of magnesium were immersed opposite each other in the bath. The opposed area was 6 mm. x 6 mm. on the movable electrode surface and 6 mm. x 36 mm. on the fixed electrode surface. A direct current voltage was impressed between the electrodes. The movable electrode was reciprocated on the fixed electrode surface at the rate of 600 times per minute, the rubbing distance being 30 mm. The treatment was continued for two hours during which the arc discharge current gradually decreased from 15 amperes to 2 amperes. Then by the thermal and electrical action of the arc current and by the reducing action of the electrode metal, $TiBr_3$ was produced from the $TiBr_4$. The $TiBr_3$ thus produced was immediately cooled to a temperature below about 400° C. where its thermodecomposition could not occur. At this time, the arc discharge area of said electrode and the arc discharge current should be properly adjusted. If the electrodes are only separated and connected, the passage and interruption of electricity and the arc discharge which is a transitionary phenomenon from said passage to interruption will not be smoothly carried out and finally the arc discharge will be entirely stopped. In order to eliminate such phenomenon, if the electrodes are caused to rub each other and to have the electrode surfaces renewed thereby when they are in contact with each other, the desired arc discharge will be continued.

In this example, the arc discharge current gradually decreases from 15 amperes to 2 amperes within 2 hours of operation because, as the discharge progresses, low valency halide $TiBr_3$ and $MgBr_2$ which are solid nonconductors of electricity are gradually produced and accordingly the fluidity of the bath is reduced. When a proper fluidity has been reached, the bath components are separated by such means as distillation or filtration. Thus the desired $TiBr_3$ and lower valency halide can be obtained. In the above example, 125 g. of $2TiBr_3 + MgBr_2$ were obtained by operation for two hours.

An example of continuous arc discharge will now be described. Two magnesium electrodes 0.5 cm.$^2$ in cross-section were set opposite each other with a discharge clearance of 1 mm. between them in the same bath as in the first example. Both ends of an induction coil for discharge in a clearance of 15.5 cm. between needle electrodes in the air were connected to the electrodes. At the same time, D. C. 100 volts were impressed between said electrodes and 30 amperes of electricity were passed. The bath between both electrodes was agitated by means of a stirrer. After two hours about 100 g. of $2TiCl_3 + MgCl_2$ were obtained.

In each of the foregoing examples, a single compound was used as the bath. However, in order to make smooth arc discharge easily occur and to reduce the diminishing degree of the fluidity of the bath due to the produced low valency substance, it is advisable to add a suitable auxiliary substance to the bath of the high valency halide and to produce a low valency halide by causing arc discharge as described above in the thus prepared bath. An example of such a bath is as follows:

An auxiliary bath was prepared by mixing 25 g. of 40 mol percent LiBr and 115 g. of 60 mol percent $AlBr_3$ as auxiliary substances. A mixed bath at 140° C. was prepared by making said auxiliary bath 90 mol percent of the whole and adding thereto 19 g. of $TiBr_4$ as a high valency halide so as to be 10 mol percent of the whole. Two aluminum electrodes were immersed opposite each other in the bath. The electrodes were connected to a source of an alternating current voltage of 70 volts through a variable resistor and were adjusted so as to pass a current of 10 amperes at the time of complete contact of the electrodes. When intermittent arc discharge which discharged electricity for about $\frac{1}{100}$ second about every 15 seconds was made to act, the wanted low valency halide $TiBr_3$ was produced in the auxiliary bath.

The TiBr$_3$ thus obtained is difficult to remove as it is. However, the AlBr$_3$ and TiBr$_4$ in the auxiliary bath are almost completely distilled and removed at 260 to 270° C. and a mixture consisting mainly of TiBr$_3$+LiBr is obtained. However, it is difficult to completely remove the AlBr$_3$ from the mixture. Therefore, thus produced TiBr$_3$ cannot be used for electrolytically depositing pure titanium metal but can be used for electrodepositing a titanium alloy containing some aluminum.

If KBr is further added to the auxiliary bath of the above example, the electric conductivity will become comparatively favorable and, even if the electrodes are not brought into contact with each other, almost continuous spark discharge (of the nature of arc discharge) will be produced at both electrodes.

In the case of both of the above examples, it is desirable to agitate or circulate the bath whereby the substance heated at the discharge location due to the arc discharge will be removed from the place of the arc and a comparatively low temperature portion of the bath will be introduced there. Under a continuous arc discharge, as in the above example, the electrodes may be heated above the thermodecomposition temperature of the low valency halide produced. Therefore, it is advisable to circulate the bath so as to bring a comparatively low temperature portion of the bath into contact with the electrodes by providing, for example, a propeller type stirrer.

In this example, the above-mentioned rubbing function accompanied with friction in the part of contact is not necessary and yet arc discharge can be continued smoothly with a low voltage, because the additional auxiliary bath can partly dissolve the produced TiBr$_3$, can make it easy to remove the reaction product adhering to the electrode surfaces and has a slight electric conductivity. The fact that the bath has electric conductivity gives the same effect as extremely shortening the discharge clearance.

In the above examples, as metals to perform the so-called reducing action of converting a high valency compound to a low valency compound, only three kinds of metals, namely, titanium, magnesium and aluminum are exemplified. However, metals, such as zinc, silver, mercury, arsenic and tin in addition to the above three, which are so strong in affinity as to be able to reduce a halogen element constituting a high valency halide of titanium at high temperatures can be utilized. However, the choice of electrode metals should be made by considering whether the specific kind of such metallic salts to be mixed into a low valency compound is suitable for the respective object of use such as, for example, for using the low valency substance as a material for electrolysis.

Further, the above object of production can be attained even without the interruption of the current, by the operation of disconnecting and connecting both electrodes in a manner wherein both electrodes are first brought into contact with each other and are then separated as illustrated in Fig. 4 of the drawings, the arc discharge thus generated is utilized for the prosecution of the reaction and both electrodes are again brought into contact with each other during the continuation of the arc. In the above-mentioned case, in order to remove the low valency product produced on the electrode surfaces, the electrodes are made circular and rotated, and the low valency substance which has been produced by the previous discharge and adheres to the electrode surfaces is removed by a scraping means, for example, by bringing a spatula-shaped brush into contact with the substance outside the discharging position. Thus, the discharging surface being renewed, a smooth operation will be attained.

If the desired reaction product accumulated in the bath is further subjected to the action of arc discharge, the amount of the already produced low valency halide being again subjected to the action of arc discharge will gradually increase and the yield for a given time of operation will gradually decrease. In order to prevent this defect, it is advisable that the bath once subjected to the above-mentioned reaction at the arc discharge position should be removed and separated into the produced substance and the substance constituting the original bath by such means as filtration and that only the substance constituting the original bath should be again fed to the arc discharge position.

In practicing the above process, it is advantageous that the bath should be made to flow from a nozzle located at a higher position down to the arc generating position so that the arc discharge generating position of the opposed electrodes may be enclosed in the flowing bath, the bath which has once passed the arc generating position and has flowed down, being caught and separated into the product and the substance constituting the original bath by such means as filtration or evaporation and only the substance constituting the original bath being returned to the nozzle.

The position of the arc discharge should be in a bath of only the high valency halide or in a bath containing said compound which bath is at a temperature at which the desired low valency halide is stable in respect of heat equilibrium. The atoms and molecules in the reaction system are subjected to the thermal and electrical action for the time necessary for the reaction by the arc discharge in the bath and are then quickly released from said action, the above-mentioned conditions by causing the arc discharge intermittently or by causing the arc discharge continuously and carrying out the circulating operation whereby the bath is properly moved from the arc discharge position. That is to say, if the above action and operation are not adequate and the reaction system is unnecessarily subjected to the thermally and electrically activating action, the current efficiency will be greatly reduced.

When arc discharge is caused in TiCl$_4$ using titanium for electrodes, the following reactions take place.

TiCl$_3$ is produced by the reaction: Ti+3TiCl$_4$⇌4TiCl$_3$. When the reaction products are removed so that no reverse reaction may occur, the product can be obtained in the form of TiCl$_3$. However, if the product is left in the arc discharge and is continuously subjected to the exciting action, the TiCl$_3$ will gradually thermodecompose at a temperature above about 450° C. and will be very unstable in such condition of excessive energy. Therefore, it proceeds to the right side in the reaction: 2TiCl$_3$⇌TiCl$_2$+TiCl$_4$.

Further the produced TiCl$_2$ is likewise unstable in the condition of excessive energy and proceeds toward the right in the reaction: 2TiCl$_2$⇌Ti+TiCl$_4$ producing metallic titanium. As long as the thus produced titanium is in the atomic form, it is active. As soon as the titanium is released from the above-mentioned exciting action, it will act on TiCl$_4$ in its vicinity and will be converted to TiCl$_3$. On the other hand, when the titanium is combined with another titanium, it will lose activity. Therefore, when the titanium is released from said exciting action, it will form metallic titanium powder, the part of energy required to make it act toward the right in the above reaction formulae will become a loss and the current efficiency will be reduced.

Therefore, in the case of obtaining a thermodecomposing reaction product such as the desired products of the present invention, the temperature within the reaction chamber including the electrode parts must be kept below a temperature at which such products as are unstable at high temperatures may remain stable.

From the point of view of easily causing and maintaining arc discharge, it has been already known to cause arc discharge in a gas phase high valency compound. In such case, reaction by-products mix into the desired reaction product. There are inventions specifically intended to prevent mixing of by-products such as, for example, the invention claimed in U. S. Patent No. 1,046,043 wherein hydrogen or other reducing gas is mixed into a gas phase high valency compound, a material which is inactive with respect to the materials under treatment is chosen for electrodes, a water-cooling means is provided, arc discharge is caused between both electrodes in said gas mixture while the material forming the electrodes is prevented from being electrically and chemically consumed and damaged and thus it is attempted to obtain the desired product in a pure state.

In the case of the invention of the above patent, only the desired product is in the solid phase and therefore the desired product in the solid phase is blown off from the arc discharge position and is prevented from being subjected to reverse reaction by the expansion of gases accompanying the arc discharge, etc. However, in producing low valency halides of titanium by said method, in case such compound adheres to a part of the surface of the electrode, the electric conductivity of said part will be interfered with and the discharge at a low voltage will become difficult to continue. Therefore, the function of the electrode cannot be perfect until said adhering product and the underlying molten metal are together blown off or the adhering product is thermodecomposed due to the heat generated by the discharge continued in the vicinity of said adhering part and the electric conductivity is recovered and said part becomes an arc discharge spot.

Therefore, the above method can be used in producing a reduction product that, like boron, will merely melt and will not cause thermodecomposition when heated excessively and will have electric conductivity at high temperatures even when it adheres to the electrode. However, said method is difficult to use to produce such substance as low valency halides of titanium which are low in electric conductivity and are apt to be thermodecomposed. Even in the case where a gas phase reducing agent is used and the electrodes do not participate in the reducing reaction, the situation is as mentioned above. In the case where the electrode directly participates in the reducing reaction, the low valency substance will be produced mostly on the electrode surface and, therefore, the above-mentioned defect will become further conspicuous. In short, it can be said that when the desired reaction product is a nonconductor of electricity and is thermodecomposing, the existing method of arc discharge reduction will not provide a method of producing the desired product at the best efficiency. That is to say, in order that arc discharge may be caused in the gas phase and the reducing reaction may be effected by the substance forming the electrode, the substance forming the electrode must be heated up to a temperature where it can act as a member of the reaction system. However, it is impossible to satisfy the condition that the low valency reaction product in contact with the substance forming the electrode (such as metallic titanium or magnesium) should not be heated above the thermodecomposing temperature.

In case said substance is heated above that temperature, thermodecomposition loss of the produced low valency substance will occur to a considerable extent and at the same time the metallic portion produced as a result of the thermodecomposition will be mixed in the product.

If arc discharge is caused in the liquid phase, as the arc discharge spot on the electrode is a metallic part forming the electrode and the product in contact with the electrode remains as dipped in the liquid, the product will not be heated up to the thermodecomposing temperature so quickly. Intermittent discharge or the circulation of the bath which will produce the same effect as intermittent discharge is carried out with a view to preventing the rise of the temperature of the product above the thermodecomposing temperature due to heat generation accompanying the arc discharge.

In relation to preventing the rise of the temperature of the product it is concluded as a result of experiments as to the nature of the arc used that the intermittent arc which has an arcing duration of less than one-tenth of a second or the continuous arc—the arc spots of which are moving about on the electrode all the time, and unable to maintain their same positions but for less than one-tenth of a second—should be used. In case the arc spot maintains its same position any longer than the said duration, the arcing functions, especially, in the liquid would lose their significance to a considerable extent. This is probably due to the fact that if a certain part of the electrode is so severely heated up for a duration of more than one-tenth of a second, the reaction zone will be formed where the arc is spotted on the electrode, and then the liquid in and around the said zone will have been vaporized with the result that the "ordinary reaction in the gaseous phase" will occupy most part in the whole reaction process.

However, it should be pointed out here that if the continuous arc is caused in the violently agitated liquid, the arc spot will unsteadily run about on the electrode moving from place to place. Where the continuous arc is used, the circulation of the liquid will bring about the same effect as the intermittent arc by supplying a good deal of cold liquid to the arc position while changing the nature of the arc so as to be suitable for the object to be attained.

Therefore, the expected object will be difficult to attain, unless, as shown in the above examples, severe thermodecomposition is prevented by rubbing both electrodes or by forming a bath so that the product may be partly dissolved and removed and intermittent discharge or circulation of the bath derive the same effect as of the intermittent discharge is used.

The method of the present invention is superior to the above-mentioned known method in the following points in addition to the above-mentioned points:

(1) In using hydrogen gas as an existing gas phase reducing agent, hydrogen is, as well known, so explosive as to present great danger when applied to a large scale apparatus for mass production. In the present invention, as no such explosive gas as hydrogen is used, there is no such danger.

(2) Whereas the low valency halide of titanium produced by hydrogen reduction has a defect of being self-inflammable, the product of the present invention is not self-inflammable.

(3) In a reaction between a gas phase high valency substance and a gas phase reducing gas is used, the density of the molecules participating in the reaction will be lower than in the case where arc discharge is made to take place in the liquid as in the present invention. Therefore, the number of molecules reacting per unit time will be smaller and the loss of energy and the time required will be greater than in the method of the present invention.

(4) In reducing a gas phase high valency substance with a gas phase reducing gas, the produced low valency substance will be formed as very fine grains, will easily react on the atmosphere in contact with it, will be unstable and will be difficult to handle industrially. In the present invention, as the reducing reaction is caused with the substance forming the electrode in a bath consisting of the substance to be reduced, the product will be stable and will be easy to handle industrially.

(5) As compared with the arc discharge in the gas phase, in the arc discharge in a liquid as in the present invention, the volumetric expansion due to heat generation by the arc will be larger, therefore the action of removing the product from the area activated by the arc discharge will be strong and it will be easy to attain the expected object.

The bromide and chloride of titanium have been particularly mentioned above. Titanium and zirconium are so similar to each other in nature that a halide of zirconium can be operated in the same manner. However, the high valency halides of zirconium remain solid up to a considerably high temperature. Therefore, it is necessary to prepare a bath by adding a suitable auxiliary substance which will dissolve the halide and to make it react in an arc discharge in the bath. The method of the present invention can also be applied to cases where the reducing action by a metal and the thermal equilibrium can be established in the bath in addition to the cases mentioned above.

As mentioned above, a particular purpose of the present invention is to provide an industrial producing method wherein high valency halides of titanium can be easily converted to low valency halides by utilizing intermittent arc discharge in a bath or arc discharge accompanied with the circulation of the bath which will bring about the same effect as of the intermittent arc discharge. It is a method of easily and economically producing a compound which is a material for manufacturing titanium and whose valency is three or less.

This application is a continuation-in-part of our application Serial No. 394,234, filed November 24, 1953, now abandoned.

We claim:

1. The method of producing low valency halides of titanium which comprises subjecting a liquid bath containing at least one high valency halide of titanium to arc discharges between metallic electrodes immersed in said bath, said metallic electrodes having a reducing action on the high valency halides and being of a metal selected from the group consisting of titanium, magnesium, aluminum, zinc, silver, mercury, arsenic and tin, the period of continuous discharge at any one point of the electrodes not exceeding one tenth of a second and the lower valency halide of titanium deposited on the electrodes being continuously removed therefrom to renew the position of arc discharge.

2. The method according to claim 1 wherein the liquid bath is subjected to intermittent arc discharge.

3. The method according to claim 1 wherein the metallic electrodes are rubbed against each other under a fixed pressure.

4. The method according to claim 1 wherein at least one of the electrodes is rotated in contact with the other electrode under a fixed pressure.

5. The method according to claim 1 wherein the electrodes are intermittently brought into contact and separated.

6. The method according to claim 1 wherein the electrodes are intermittently brought into contact and separated without interruption of the current supply to the electrodes.

7. The method according to claim 1 wherein the bath includes at least one auxiliary substance in addition to the halide of titanium.

8. The method according to claim 7 in which the auxiliary substance increases the conductivity of the bath.

9. The method according to claim 7 in which the auxiliary substance has a solvent action on the reaction products.

10. The method according to claim 1 in which the liquid bath is recirculated in a stream through the arc discharge.

11. The method according to claim 10 in which the reaction products are separated from the said stream after it passes through the arc discharge and before it is returned thereto.

12. The method according to claim 1 wherein the position of the arc discharge is renewed by means of an auxiliary substance in the bath having a solvent action on the reaction products adhering to the electrode surface.

13. The method according to claim 1 wherein the arc discharge is inductively modified.

14. The method according to claim 1 wherein the arc discharge is capacitively modified.

15. The method according to claim 1 wherein the arc discharge is inductively and capacitively modified.

16. The method according to claim 1 wherein at least one of said electrodes is titanium.

17. The method according to claim 1 wherein at least one of said electrodes is magnesium.

References Cited in the file of this patent

UNITED STATES PATENTS

| | | |
|---|---|---|
| 1,046,043 | Weintraub | Dec. 3, 1912 |
| 2,074,530 | Baumann et al. | Mar. 23, 1937 |
| 2,353,770 | Suits | July 18, 1944 |

FOREIGN PATENTS

| | | |
|---|---|---|
| 296,867 | Germany | Mar. 13, 1917 |